United States Patent [19]
Yoshida et al.

[11] Patent Number: 5,128,985
[45] Date of Patent: Jul. 7, 1992

[54] COMMUNICATION SYSTEM HAVING A PLURALITY OF VOICE COMMUNICATION TERMINALS AND A DATA COMMUNICATION TERMINAL

[75] Inventors: Takehiro Yoshida, Tokyo; Kenzo Sakakibara; Kozo Toda, both of Yokohama, all of Japan

[73] Assignee: Canon Kabushiki Kaisha, Tokyo, Japan

[21] Appl. No.: 515,320

[22] Filed: Apr. 30, 1990

Related U.S. Application Data

[63] Continuation of Ser. No. 175,353, Mar. 30, 1988, abandoned.

[30] Foreign Application Priority Data

| Apr. 1, 1987 | [JP] | Japan | 62-77544 |
| Apr. 1, 1987 | [JP] | Japan | 62-77546 |
| Jun. 2, 1987 | [JP] | Japan | 62-138788 |

[51] Int. Cl.⁵ .......................................... H04M 11/00
[52] U.S. Cl. .................................... 379/100; 358/434
[58] Field of Search .................... 379/93, 96-98, 379/100, 92, 95, 107, 142, 94; 358/434, 440

[56] References Cited

U.S. PATENT DOCUMENTS

| 4,046,966 | 9/1977 | Urui . | |
| 4,246,442 | 1/1981 | Hashimoto | 379/98 |
| 4,353,097 | 10/1982 | Takeda et al. . | |
| 4,677,660 | 6/1987 | Yoshida | 379/100 |
| 4,685,123 | 8/1987 | Hsia et al. | 379/93 |
| 4,759,055 | 7/1988 | Okumura et al. . | |
| 4,773,080 | 9/1988 | Nakajima et al. | 379/100 X |
| 4,800,429 | 1/1989 | Yoshino | 379/100 X |
| 4,815,121 | 3/1989 | Yoshida | 379/100 X |
| 4,825,461 | 4/1989 | Kurita et al. | 379/100 X |
| 4,847,891 | 7/1989 | Kotani et al. | 379/100 X |

FOREIGN PATENT DOCUMENTS

| 2811078 | 9/1979 | Fed. Rep. of Germany | 379/93 |
| 58-42353 | 3/1983 | Japan . | |
| 59-23961 | 2/1984 | Japan | 379/215 |
| 0132457 | 7/1985 | Japan | 379/100 |
| 62-24795 | 2/1987 | Japan . | |
| 2166624 | 5/1986 | United Kingdom | 379/100 |

*Primary Examiner*—Thomas W. Brown
*Assistant Examiner*—Wing F. Chan
*Attorney, Agent, or Firm*—Fitzpatrick, Cella, Harper & Scinto

[57] ABSTRACT

A communication system comprises a plurality of speech communication terminals each having apparatus for inputting data representing a station. A call is issued in accordance with the data from the communication terminal, and the system receives call data representing a station which responds to the call. The data received by the system is compared with the data input from the speech communication terminal and display units of the speech communication units are controlled in accordance with the comparison result.

36 Claims, 11 Drawing Sheets

COMMUNICATION SYSTEM HAVING A PLURALITY OF VOICE COMMUNICATION TERMINALS AND A DATA COMMUNICATION TERMINAL

This application is a continuation of application Ser. No. 175,353 filed Mar. 30, 1988, now abandoned.

BACKGROUND OF THE INVENTION

1. Field of the Invention

The present invention relates to a communication system comprising a plurality of communication terminals and a data communication unit.

2. Related Background Art

A communication system comprising a facsimile unit and a telephone set as shown in FIG. 4 has been known. In such a system, the telephone set used as a terminal device either has a calling function or does not have the calling function.

In the system in which the telephone set has the calling function, a telephone line 2a is connected to a CML (communication line) relay of a NCU (network control unit) of a facsimile unit 2 and the line is switched between a facsimile transmitter/receiver and a telephone set 4 by the CML relay. In a manual transmission mode of such a system, the CML relay is switched to the telephone set 4 and a selection signal is sent by a calling device of the telephone set 4. In the calling mode, the telephone set 4 is directly connected to the telephone line 2a and the facsimile unit 2 is not connected. As a result, the dialing signal sent to the line cannot be recognized by the facsimile unit 2.

In a system in which the telephone set 4 does not have the calling function and the calling function provided in the facsimile unit 2 is used or a system in which the facsimile unit 2 has dialing means such as a ten-key and a calling circuit, the facsimile unit 2 can recognize the telephone number when the telephone number is entered by the facsimile unit 2, but it cannot recognize the telephone number when it is manually sent by the telephone set 4.

In the prior art system, when the manual operation is performed done in the telephone set, the facsimile unit cannot recognize the telephone number. Accordingly, it is not possible to check whether the operator has called the desired station by comparing the entered telephone number with the telephone number of the destination station transferred in the facsimile protocol.

In the prior art system, there is rarely a possibility of misconnection by a malfunction of a communication network. On the other hand, as communication is liberalized, there is a possibility that different communication equipment are connected to different communication apparatus and so the possibility that communication is made among equipment of different manufacturers increases. Also, the status of the communication network is not always constant. In these situation, a possibility of misconnection is not zero.

In speech communication, the speech communication is not attained in the case of misconnection and the misconnection may not raise a serious problem although the communication cost increases and the operation by a user is complex. In the case of facsimile transmission, however, information of a text may be transmitted to a misconnected wrong station if the station has a facsimile unit. Thus, a text of high confidentiality cannot be transmitted with reliability.

In order to avoid the above problem a system is required in which the calling function is under the control of a control unit which is common to communication apparatus including a telephone set as a terminal and a facsimile unit so that the entered telephone number and the telephone number transferred from the destination station are compared.

Recently, there are increasing cases where not only the telephone set but also the facsimile unit or data communication apparatus are connected to the telephone line. When a communication apparatus other than a voice terminal such as a facsimile unit or a data communication apparatus is used, it is usual to construct a system which allows both voice communication and predetermined communication by the communication apparatus.

In order to allow both voice communication and the predetermined communication operation, one of several methods may be used. In one method, different lines are provided for the voice communication and the predetermined communication and they are called by different telephone numbers. In this system, since the communication apparatus is in many cases connected together with the telephone set, it is possible to send and receive calls for speech by manual operation, but when the communication apparatus is in the auto-receive mode, it is not possible to receive the call for speech.

In one system, a representative number is used to connect the communication apparatus. As is well known, in the system which uses the representative number, if the line corresponding to the representative number is busy, a line corresponding to another telephone number is used for communication. The following two methods may be used to connect the communication apparatus to the system which uses the representative number.

In one method, a line control unit detects a voice signal from a calling station each time it receives a call in order to determine whether the calling station intends to perform voice or non-voice communication, and selects an appropriate terminal device. In this method, any number may be used to attain both the voice communication and the communication of the predetermined type but the system cost is very high because it requires a voice recognition apparatus. Further, if all communication apparatus which are connected are busy, the communication of the predetermined type is not attained even if the calling station desires the communication.

In a communication system which accommodates a plurality of telephone lines by a representative number, a communication apparatus is allotted to a specific telephone number and the non-voice communication instead of the voice communication is made if the number corresponding to the communication apparatus is called. In this system, when a call is sent by the representative telephone number and the lines corresponding to other telephone numbers than the representative number are busy, the line to which the communication apparatus is connected is selected. In such a case, speech is not attained even if the calling station desires it.

In the facsimile unit, speech may be assured by phone reservation even if the communication apparatus is selected but such a control requires a complex operation.

In a push button telephone system which has a hold function, if an external line is held for more than a predetermined time, a hold alarm sound is generated to prevent invalid hold. The hold alarm sound is generated at a predetermined time interval from the start of external line hold. The predetermined time may be set arbitrarily, for example, 1, 2, 3, 4 or 5 minutes. The duration of the hold alarm sound is generally set to approximately ten seconds.

In such a system, when the external line is held, it is not possible to determine how long the time has elapsed since the external line was held, by merely hearing the hold alarm sound. If the operator does not respond while the external line is held, the external line is kept held for no reason.

The communication systems comprising a plurality of voice terminals and a facsimile unit are disclosed in U.S. patent appln. Ser. No. 823,286 filed on Jan. 28, 1986, which issued as U.S. Pat. No. 4,825,461 on Apr. 25, 1989; U.S. patent appln. Ser. No. 813,514 filed on Dec. 26, 1985, which issued as U.S. Pat. No. 4,785,355 on Nov. 15, 1988; U.S. patent application Ser. No. 453,364 filed on Dec. 20, 1989, which was a continuation of U.S. patent appln. Ser. No. 108,915 filed on Oct. 15, 1987, now abandoned; and U.S. patent appln. Ser. No. 106,783 filed on Oct. 13, 1987 pending, and U.S. patent appln. Ser. No. 134,806 filed on Dec. 18, 1987, which issued as U.S. Pat. No. 4,870,680 on Sept. 26, 1989.

SUMMARY OF THE INVENTION

It is an object of the present invention to provide an improved communication system comprising a plurality of communication terminals and a data communication unit.

It is another object of the present invention to overcome the problems described above.

It is a further object of the present invention, to efficiently connect a communication line to a destination station.

It is still a further object of the present invention to compare calling data with the station connected to the line, by a line control unit when the line control unit calls by the calling data supplied from a communication terminal.

It is another object of the present invention to switch between speech and data communication in accordance with a call from a station.

It is a further object of the present invention to inform a hold state of the communication line by sound.

Other objects of the present invention will be apparent from the following detailed explanation of the invention.

DESCRIPTION OF THE PREFERRED EMBODIMENTS

Preferred embodiments of the present invention will be explained in detail with reference to drawings.

In a first embodiment, a telephone number actually connected to a line is received by a facsimile communication protocol and the received telephone number and a telephone number entered by a telephone set are compared.

Figure 1:
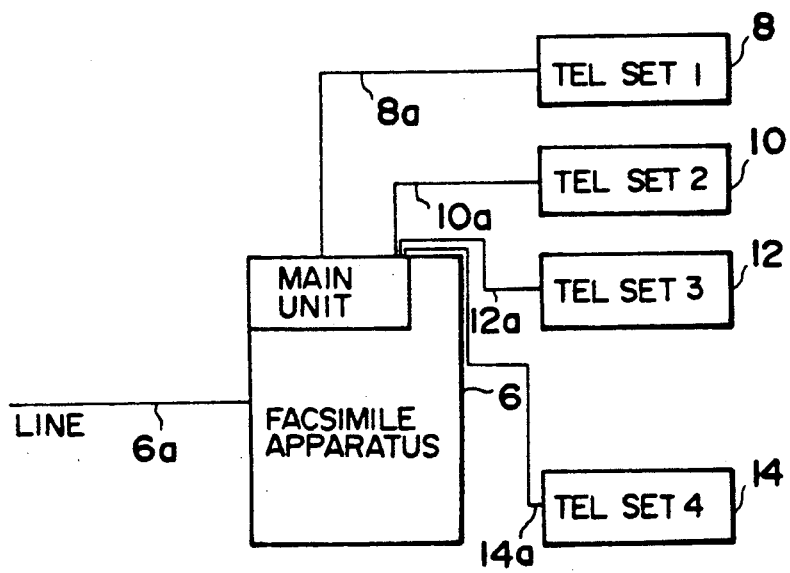
FIG. 1 is a block diagram of a first embodiment of a communication system of the present invention.

FIG. 1 shows a block diagram of a communication system in accordance with the first embodiment. In the present system, telephone sets 8, 10, 12 and 14 have no calling function by themselves. They have telephone number input means such as ten-key or one-touch key panels but have no circuit for generating a selection signal in response to the input. Those telephone sets are connected to a facsimile unit 6 through signal lines 8a, 10a, 12a and 14a.

The facsimile unit 6 includes a main unit having a sole calling function in the system. Thus, in the present system, the telephone number data entered by the telephone set 8, 10, 12 or 14 is supplied to the main unit of the facsimile unit 6, and the main unit generates a selection signal in accordance with the input and sends it to a line 6a. The main unit of the facsimile unit 6 compares the telephone number entered by the telephone set with the telephone number of the destination station transferred therefrom in accordance with a predetermined protocol, and changes a subsequent communitation control condition in accordance with the comparison result. In FIG. 1, the telephone sets 8, 10 and 12 are separately constructed from the facsimile unit 6 and located at different locations than the facsimile unit such as on desks of operators in an office. When the telephone set is constructed separately from the facsimile unit 6, it is located near the facsimile unit 6. Otherwise, it may be a handset integral with the facsimile unit.

Figure 2:
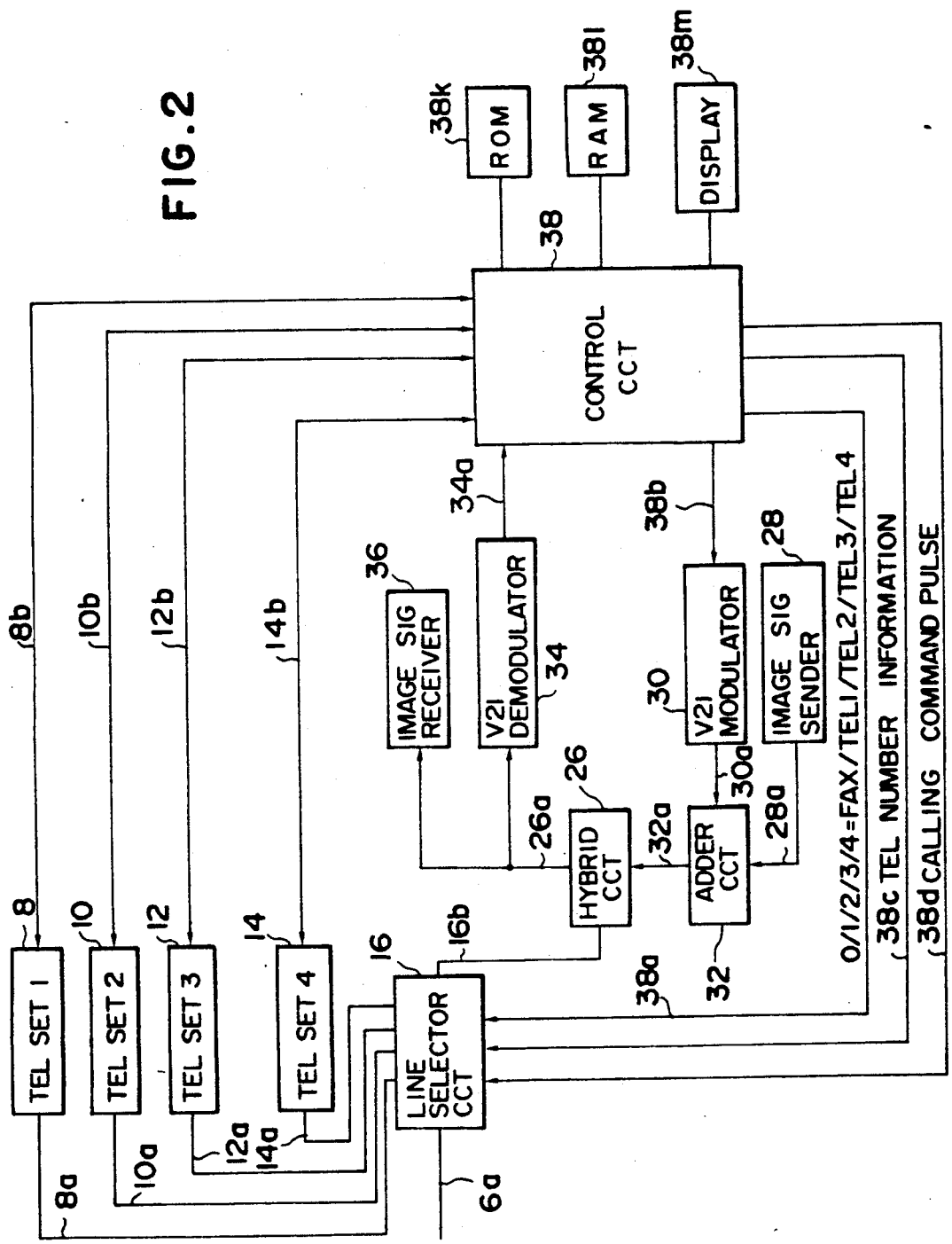
FIG. 2 shows a detailed block diagram of the first embodiment.

FIG. 2 shows a detailed block diagram of the system of FIG. 1.

As shown in FIG. 2, the telephone sets 8-14 are connected to the line 6a through a line selector 16. Voice lines 8a, 10a, 12a and 14a of the telephone sets are connected to the line selector 16 so that they are selectively connected to the line 6a. The telephone sets 8-14 are connected to a control circuit 38 through control lines 8b, 10b, 12b and 14b. The control circuit 38 controls image transmission and reception of the facsimile unit and calling connection of the system comprising the facsimile unit and the telephone sets. It may be a microcomputer. A control program to be described later is contained in a ROM 38k. A RAM 38l is provided to store image data to be transmitted and received and telephone number data transmitted by preset key control or one-touch key control, and for use as a work area for the control circuit 38.

The line selector 16 connects the line 6a selectively to the telephone sets and a facsimile transmission/reception circuit following a hybrid circuit 26. The connection state is controlled by the control circuit 38 through a signal line 38a. The control circuit 38 outputs five data levels "0-""4" to the signal line 38a and connects the line 6a to a selected one of the facsimile unit and the telephone sets 8, 10, 12 and 14 depending on the data level.

The line selector 16 also contains a dialing device which outputs an appropriate selection signal to the line, such as dial tone or dial pulse. It receives the telephone number data to be sent from the control circuit 38 through a signal line 38c. A call timing is specified by the control circuit 38 through a signal line 38d.

The hybrid circuit 26 divides the facsimile transmission/reception signal, and it is connected to the line selector 16 through the signal line 16b. The hybrid circuit 26 is connected to an image signal receiver 36 and a demodulator 34 which demodulates a protocol signal through a signal line 26a.

On the other hand, an adder 32 is connected to the hybrid circuit 26 through a signal line 32a. The adder 32 is provided to supply the protocol signal and the image signal to be transmitted to the hybrid circuit 26, and it receives the output signal of an image signal transmitter 28 through a signal line 28a. Also it receives the protocol signal from a modulator 30 through a signal line 30a.

The facsimile transmitter/receiver are substantially identical to the conventional ones and details thereof are omitted. As is well known, the image signal transmitter comprises an image reader and encoder, and the image signal receiver comprises a composer and an image recorder. A modulator 30 and a demodulator 34 have modulation/demodulation systems which comply with the CCITT Recommendation V21. The demodulated protocol signal is supplied to the control circuit 38 through a signal line 34a. The protocol signal to be transmitted is supplied to the modulator 30 from the control circuit 38 through a signal line 38b.

In the present system, when a destination station is to be called for voice communication or facsimile communication, a ten-key or one-touch key of the telephone set 8, 10, 12 or 14 is manipulated to enter the telephone number. The entered telephone number is supplied to the control circuit 38 through the control lines 8b or 14b. The control circuit 38 supplies the input telephone number to the line selector 16 through the signal line 38c and sends a calling command pulse to the signal line 38d so that the line selector 16 outputs the selection signal. If a one-touch key or preset key of the telephone set is used, the control circuit 38 looks up a telephone number stored in the RAM 38l or other memory means (not shown) and sends it to the line selector 16. In this manner, the destination station is called.

Figure 3:
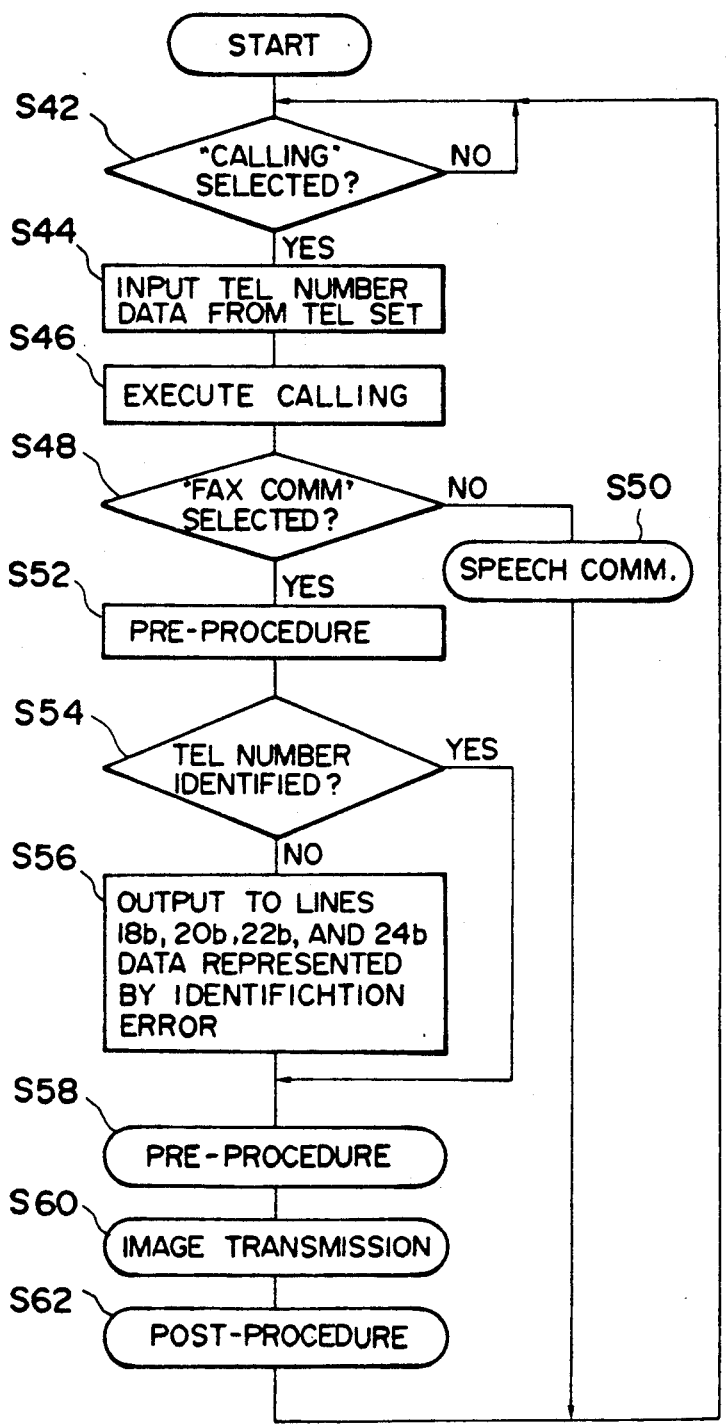
FIG. 3 shows a flow chart of a control operation of a control circuit of the first embodiment.
Figure 4:
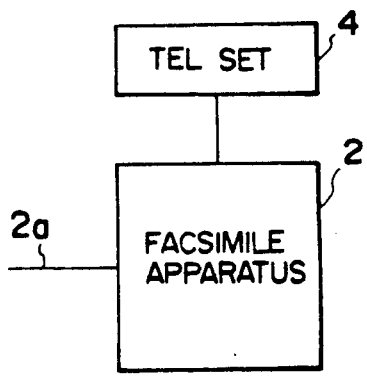
FIG. 4 shows a block diagram of a conventional communication system.

In the facsimile transmission, a telephone number of a called station is sent as a CSI (called station identification) signal in a pre-communication protocol. The protocol signal including the telephone number data is demodulated by the demodulator 34 and it is supplied to the control circuit 38. In the facsimile transmission, the control circuit 38 stores the input telephone number data from the telephone set into the RAM 38l and compares it with the telephone number data of the destination station contained in the protocol signal on the signal line 34a. If the telephone numbers are equal, the image transmission or the image reception by polling is effected. If the telephone numbers are not equal, an alarm is displayed or the line is disconnected to inhibit the communication. There may be many measures to be taken when the telephone numbers are not equal, and one example thereof is shown in FIG. 3, which shows a control program of the control circuit 38. The program is stored in the ROM 38k.

The procedure of FIG. 3 is started in response to power-on or system reset. The control circuit 38 determines, in a step S42 of FIG. 3, whether the call has been selected or not. This is done by detecting the operation of the call button or ten-key of the telephone set.

If the call has been selected, the telephone number data of a predetermined format is received from the telephone set 8, 10, 12 or 14 in a step S44. The telephone number data is supplied through the signal line 8b, 10b, 12b or 14b.

In a step S46, calling is made in accordance with the input telephone number data. The telephone number data and the command pulse are received through the signal lines 38c and 38d, and the calling is made by the line selector 16.

In a step S48, whether the facsimile communication has been selected or not is determined. This is done by detecting a predetermined input operation by a control panel (not shown) of the telephone set or the facsimile unit When the facsimile communication is not required, normal speech is made in a step S50 and then the process returns to the step S42. When the facsimile communication is required, a predetermined pre-communication protocol is effected in a step S52. In the facsimile protocol, for example, G3 protocol, the telephone number of the destination station is transferred as a CSI signal in the pre-communication protocol. The protocol signal containing the telephone number is demodulated by the demodulator 34 and it is supplied to the control circuit 38.

In a step S54, the control circuit 38 compares the telephone number entered by the telephone set in the step S44 with the telephone number sent from the destination station by the protocol signal. If the telephone number transferred from the destination station is equal to the entered telephone number, the process proceeds to a step S58 where the rest of the pre-communication protocol is executed. In a step S60, the image is transmitted or received and in a step S62, a post-communication protocol is executed. Then, the process returns to the step S452.

On the other hand, if the telephone numbers are not equal, the process proceeds to a step S56. In the present embodiment, information indicating that the entered telephone number and the telephone number of the actually connected station are different is output by a display 38m connected to the control circuit 38 or a display 8m, 10m, 12m or 14m of such the telephone set. Otherwise, alarm means such as a buzzer provided in the telephone set or facsimile unit may be activated.

Thereafter, the process may proceed to the step S58 to start the image transmission/reception. In this case, the operator acknowledges the alarm display or sound generated in the step S56, and if the communication is to be stopped, the operator manipulates a stop key of the telephone set or facsimile unit to stop the communication.

Alternatively, when the telephone numbers are not equal, the control circuit 38 may generate the alarm display or sound and disconnect the line to completely inhibit the image transmission and reception.

In the present system, if misconnection is made due to a state of communication network, it is detected and informed to the operator so that a risk to communicate with a wrong station is avoided. Thus, it is avoided to send a highly confidential text to a wrong station or receive non-required image information from a non-intended station.

In the present embodiment, the call function is not provided in duplication in the telephone sets and the facsimile unit, and the calling is done by the control unit of the facsimile unit. Accordingly, no duplicate circuit is included and the manufacturing cost of the overall system can be reduced. Since the communication control is done by the control unit which is common to the entire system, the control function may be concentrated to the control unit, and the control operations in all terminal devices and facsimile unit are controlled under one condition. The control unit can supervise the calling of the telephone set and perform appropriate automatic operation even if the telephone numbers are not equal.

In the present embodiment the facsimile unit is used as the communication apparatus which includes the main unit having the call function, although other data communication apparatus may be used to attain the same effect.

In the present embodiment, the image transmitter/receiver of the facsimile unit are not explained in detail. The image reader or recorder may be provided in the facsimile unit or in the telephone set. If the telephone numbers are not equal, the alarm display may be made on all telephone sets or on only the telephone set which entered the telephone number.

The embodiment which generates the alarm display and sound and the embodiment which disconnects the line to inhibit the communication have been explained, although many other processings may be made. For example, when the inequality of the telephone numbers is detected by the process of FIG. 3, the telephone set is on-hook. If the operator hooks off the telephone set in response to the alarm display, the line 6a may be connected to the telephone set. If the destination station is a voice terminal, the operator can speak with an operator of the destination station so that he/she may apologize for misconnection and take necessary action. The hook state of the telephone set may be detected by a known circuit.

In a second embodiment, the facsimile auto-reception is effected when the facsimile communication telephone number is called in the representative telephone number system.

Figure 5:
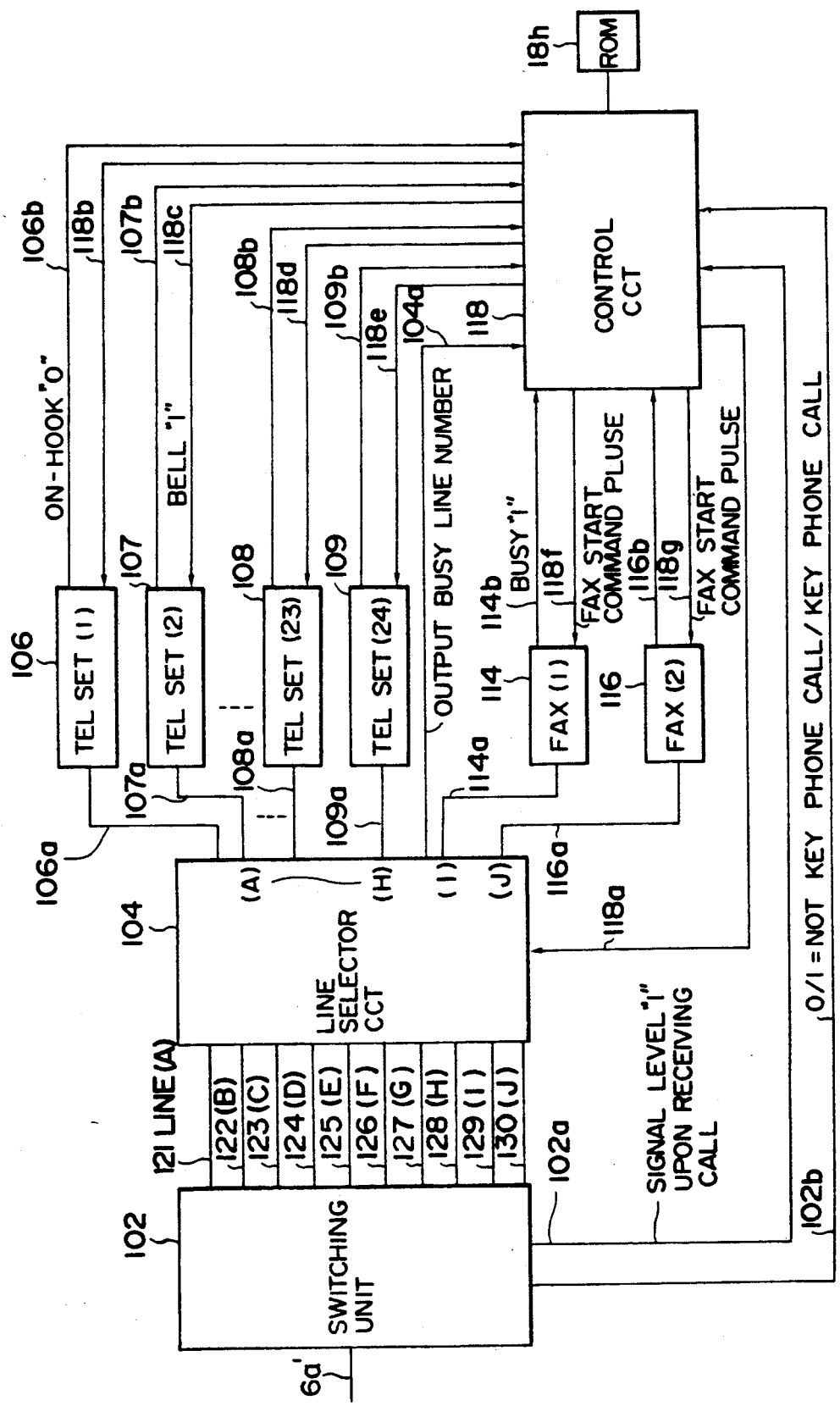
FIG. 5 shows a block diagram of a second embodiment of the communication system of the present invention.

FIG. 5 shows a configuration of the second embodiment of the communication system of the present invention. A representative telephone number system is used in the present embodiment. Ten lines 121-130 are accommodated and telephone sets A-J correspond thereto, respectively.

As terminal devices, 24 telephone sets and two facsimile units are used. In FIG. 5, only four telephone sets 106-109 are shown and 21 telephone sets of telephone sets 107-108 are omitted. The facsimile units are designated by numerals 114 and 116.

Numeral 102 denotes an internal line switcher which switches lines 121-130 to an external phone line 6a. When it receives a call, it outputs a signal level "1" on a signal line 102a. Whether a selection signal from an external line switcher corresponds to the representative telephone number or not is represented by signal level "0" or "1" produced on a signal line 102b. The signals on the signal lines 102a and 102b are supplied to a control circuit 118 which m ay be a microprocessor.

The lines 121-130 are selectively connected to the telephone sets 106-109 and the facsimile units 114 and 116 by a line switching circuit 104.

Voice lines 106a-109a for the telephone sets 106-109 are selected by telephone numbers A-H, respectively. Communication lines 114a and 116a for the facsimile units 114 and 116 are selected by the telephone numbers I and J, respectively. The line connection operation of the line selector circuit 104 is controlled by the control circuit 118 through a signal line 118a. The line selector circuit 104 supplies the busy line numbers to the control circuit 118 through a signal line 104a. The control circuit 118 selects a non-busy terminal device based on the data on the busy line numbers.

The telephone sets 106-109 are connected to the control circuit 118 through signal lines 106b-109b and 118b-118e. The signal lines 106b-109b detect the hook states of the telephone sets 106-109. They assume signal level "0" for on-hook state, and signal level "1" for off-hook state. The signal lines 118b-118e ring the bells of the telephone sets. When the signal level is "1", a calling tone is generated by the bell of the telephone set.

On the other hand, the facsimile units 114 and 116 are connected to the control circuit 118 through signal lines 114b, 116b, 118f and 118g. The signal lines 114b and 116b indicate whether the facsimile units are busy or not. It assumes signal level "1" when the facsimile unit is busy. The signal lines 118f and 118g activate the facsimile units when the signal levels thereof are "1".

When a calling station selects a representative telephone number which is one of the telephone numbers A-H, or one of those telephone numbers, one of the telephone sets 106-109 receives the call and voice communication is made therebetween. When the telephone number I or J is selected, the communication is made by the facsimile unit 114 or 116.

Figure 6:
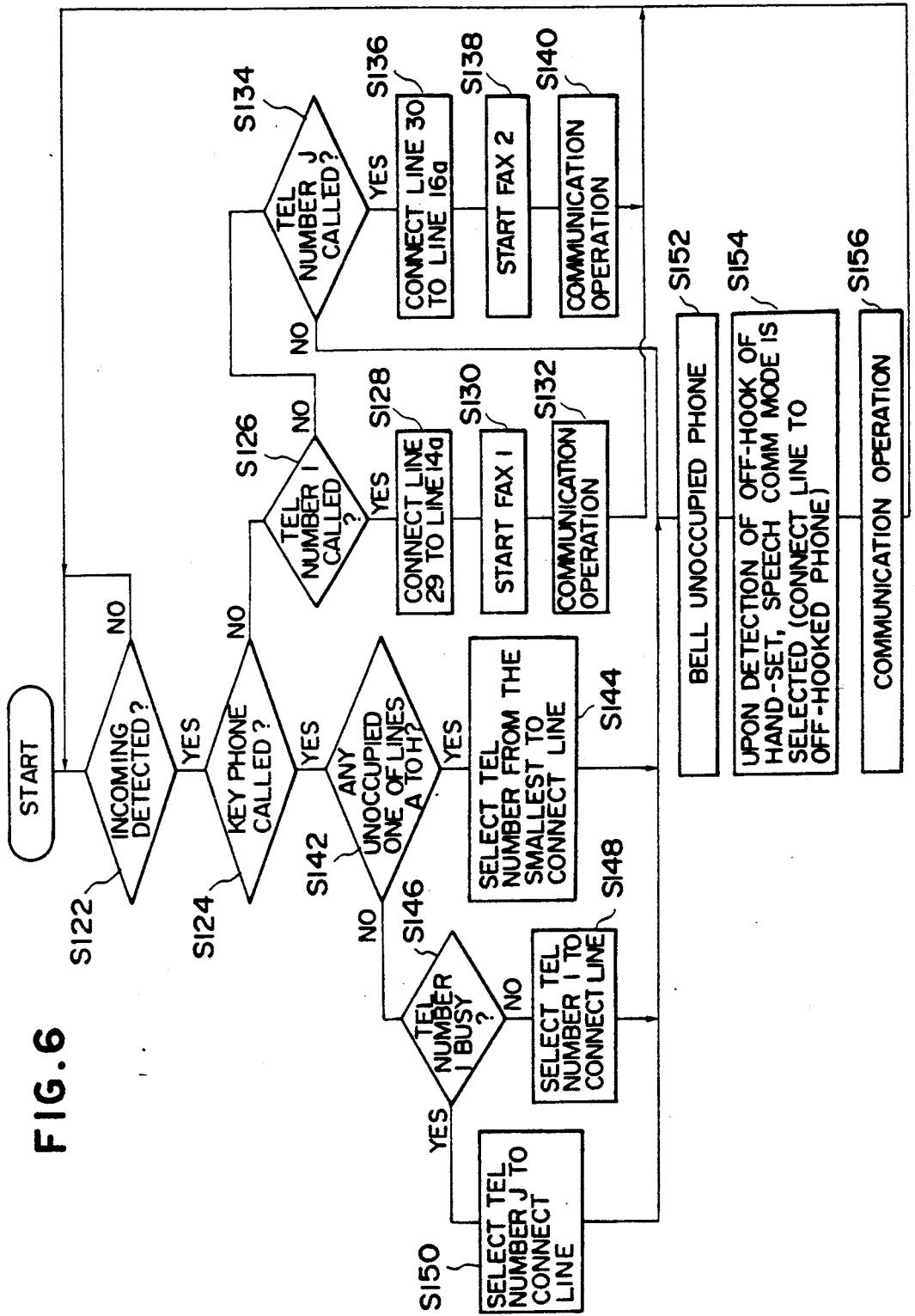
FIG. 6 shows a flow chart of a control operation of a control circuit of the second embodiment.

When the representative telephone number is called and all lines other than the lines 129 and 130 corresponding to the telephone numbers I and J are busy, one of those two lines is selected. In the second embodiment, the line is connected to the facsimile unit 114 or 116 but connected to free one of the 24 telephone sets 106-109. In this manner, the connection of the line to the facsimile unit in spite of the fact that the speech communication is required by the calling station is avoided. FIG. 6 shows a detail of the above procedure. It shows a control program of the control circuit 118, which is stored in the ROM 118h.

In a step S122 of FIG. 6, the control circuit 118 first examines the state of the signal line 102a to determine whether the switcher 102 has received a call or not. If it has, the state of the signal line 102b is examined in a step S124 to determine whether the call has been made to the representative telephone number of not. If it has, he process proceeds to a step S142, and if it has not, the process proceeds to a step S126.

In the sep S142, whether there are non-busy telephone lines in the telephone lines 121-128 corresponding to the telephone numbers A-H is examined. If there are free lines, they are selected in an ascending order in a step S144 for line connection.

In a step S146, whether the line 129 corresponding to the telephone number I is busy or not is examined. If it is busy, the process preceeds to a step S150, and if it is not busy, the process proceeds to a step S148. In the steps S148 and S150, the lines 129 and 130 corresponding to the telephone numbers I and J, respectively, are selected for line connection.

On the other hand, in the step S126, whether the call is for the line 129 corresponding to the telephone number I or not is examined. When the decision in the step S126 is YES, the process proceeds to a step S128, and when the decision is NO, the process proceeds to a step S134.

In the step S134, whether the call is for the line 130 corresponding to the telephone number J or not is examined as is doe in the step S126. If the decision is YES, the process proceeds to a step S136, and if the decision is NO, the process proceeds to a step S152.

In the step S128, the line 129 is connected to the signal line 114a by the line switching circuit 104 to select the facsimile unit 114. In the step S136, the line 135 is connected to the signal line 116a to select the facsimile unit 116.

In the steps S130 and S138, the facsimile units 114 and 116 are activated, respectively.

In the steps S132 and S140, the image communication is effected by the facsimile units 114 and 116, respectively.

In an step S152, the states of the signal lines 106b-109b are examined to detect free telephone sets and ring a bell of one of the free telephone sets. Signal lines 118b-118e are used to ring the bell.

In a step S154, the off-hook of the telephone set whose bell was rung in the step S152 is detected through the signal lines 107b-109b and the line is connected to that telephone set by the line switching circuit 104 under the control of the signal line 118a. In a step S156, the speech is made by the connected telephone set.

In the present system when the calling station selects the telephone number I or J, facsimile communication is effected by the facsimile unit 114 or 116. When the representative telephone number or one of the telephone numbers A-H is selected, the telephone set is connected and the voice communication is made by the off-hook telephone set.

When the representative telephone number is selected and the lines 121-128 for the voice communication are busy, the line 129 or 130 for facsimile communication is used for line connection. However, the facsimile unit 114 or 116 is not connected with the line 129 or 130 and one of the 24 telephone sets 106-109 is connected to effect the voice communication.

Accordingly, the reception of the call by the communication apparatus in spite of the fact that the calling station desires the speech communication is avoided in the representative telephone number system.

The facsimile units are shown as the communication apparatus in the above embodiment although other communication apparatus than the facsimile units may also be used.

In the above embodiment, the representative telephone number system is not adopted to the facsimile units corresponding to the telephone numbers I and J. When the line corresponding to the telephone number I is busy, the line corresponding to the telephone line J may be used to connect the facsimile unit 116.

In a third embodiment, a hold state of the line is informed by sound.

Figure 7:
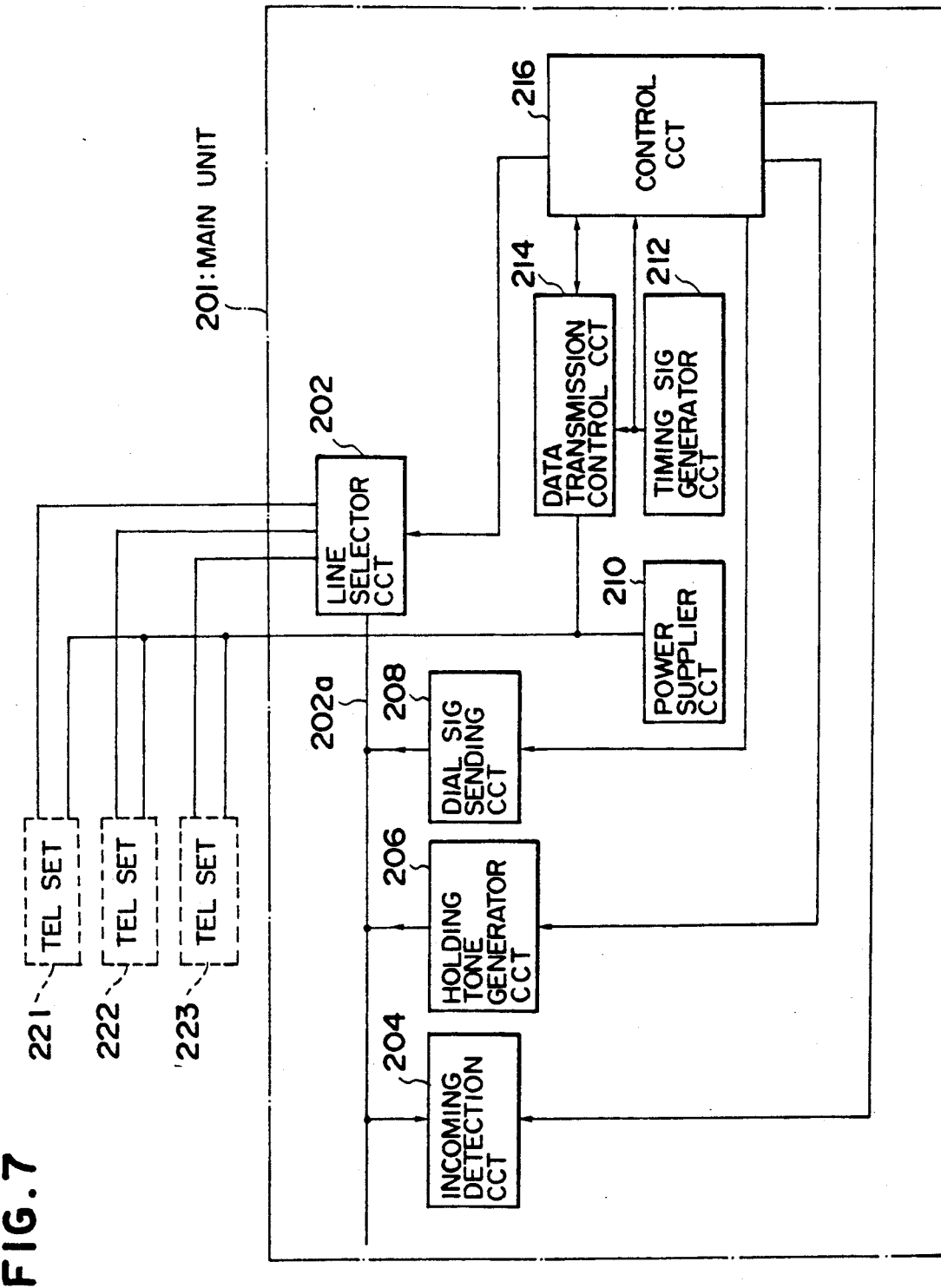
FIG. 7 shows a block diagram of a third embodiment of the communication system of the present invention, FIG. 8 a shows a block diagram of a push button telephone set in the third embodiment.

FIG. 7 shows a block diagram of a main unit 201 which controls a plurality of telephone sets.

A line switching circuit 202 releases a telephone line 202a when a signal from a control circuit 216 is "0", "1", "2" or "3" and connects the telephone line 202a to telephone set 221, 222 or 223.

A call detection circuit 204 produces an acknowledge pulse to the control circuit 216 when it detects a call signal. A holding tone generator 206 sends out holding tone to the telephone line 202a when a signal level from the control circuit 216 is "1".

A dialing signal send circuit 208 receives telephone number information from the control circuit 216 and sends out a selection signal (D.C. impulse dialing signal or push button dialing signal) to the telephone line 202a. a power supply 210 supplies 24 volts, for example, to control and power supply lines. A timing signal generator 212 generates a timing signal for data transmission. A data transmission control circuit 214 controls data transmission between the push button telephone set and the main unit 201.

Figure 8:
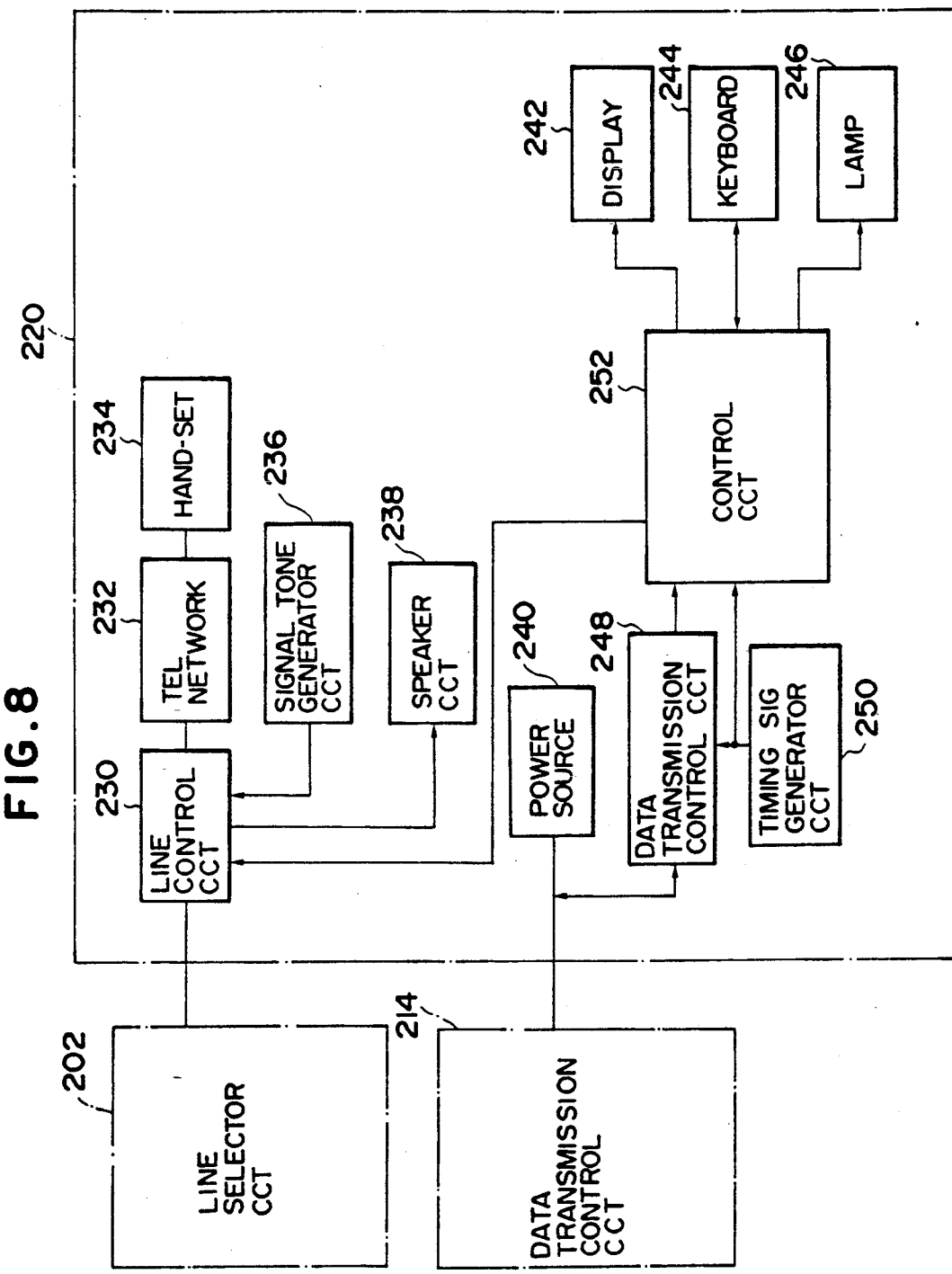

FIG. 8 shows a detailed block diagram of the button telephone set of FIG. 7. The telephone sets 222 and 223 are of the same construction as the telephone set 221.

A line control circuit 230 connects one of a telephone network 232, a signal tone generator 236 and a speaker circuit 238 to the line switching circuit in accordance with the signal from the control circuit 252. The signal tone generator 236 generates various signal tones, and the speaker circuit 238 monitors voice from other station. A handset 234 is connected to the telephone network 232.

In addition, a power supply 240, a display 242, a keyboard 244, a lamp 246, a data transmission control circuit 248 which controls data transmission between the button telephone set 221 and the main unit 201, and a timing signal generator 250 are provided.

A control circuit 252 controls the button telephone set 221. Data is transmitted between the main unit 201 and the button telephone set 221 in a known manner. The control circuit 252 starts to generate the hold alarm tone if the external (outside) line hold is not released a first predetermined time after the start of the external line hold, gradually shortens the interval between the hold alarm tones, and releases the line if the external line hold is not released a second predetermined time after the start of the external line hold.

The button telephone set 221 has external line button, hold button, internal line 1 button, internal line 2 button, internal line 3 button, radial button and 0-9, * and # buttons.

The operation of the present embodiment is now explained.

The self-hold is first explained.

It is assumed that the button telephone set 21 is using the external line when the self-hold is to be made. There are six button manipulations of the button telephone set 221.

A first button manipulation is on-hooking after depression of the hold button. When the hold button of the button telephone set 221 is depressed, a right to use the external line is shifted to the main unit 201, which sends out the hold tone to the destination station (self-hold of the button telephone set 221). When an operator of the button telephone set 221 hooks on the handset, it is a representation of operator's intention to terminate the operation and the main unit 201 releases the line upon on-hook.

A second manipulation is depression of the external line button after depression of the hold button. When the external button is depressed after the depression of the hold button, a right to use the held line is transferred to the button telephone set 221.

A third button manipulation is depression of the internal line 1 button or internal line 2 button after the depression of the hold button followed by on-hooking. When the hold button of the button telephone set is depressed, a right to use the external line is shifted to the main unit 201, and the main unit 201 sends out the hold tone to the destination station. When one of the internal line buttons of the button telephone set 221, for example, the internal line 2 button is depressed, the main unit 201 calls the transferred button telephone set 222. When the external line button is depressed, the transferred button telephone set 222 acquires the right to use the line. When the external line button of the button telephone set 221 is depressed while the button telephone set 222 is called, the button telephone set 221 acquires the right to use the line.

A fourth button manipulation is depression of the internal line button 2 or internal line button 3 under the on-hook after the depression of the hold button. When the hold button of the button telephone set 221 is depressed, the right to use the external line is shifted to the main unit 201, which sends out the hold tone to the destination station. When one of the internal line buttons of the button telephone set 221, for example, the internal line button 2 is depressed, the main unit 201 calls the transferred button telephone set 222. When the operator of the transferred button telephone set 222 hooks off the handset, the speech with the transferring button telephone set 221 is attained. The operator of the transferred button telephone set 222 may capture the external line by depressing the external line button. The operator of the transferring button telephone set 221 may also capture the external line by depressing the external line button.

A fifth button manipulation is depression of the internal line button 2 or internal line button 3 followed by on-hooking. When one of the internal line buttons of the button telephone set 221, for example, the internal line button 2 is depressed, the button telephone set 221 determines that the hold button has been depressed before the depression of the internal line button.

A sixth button manipulation is depression of the internal line button 2 or internal line button 3 under off-hook. When one of the internal line buttons of the button telephone set 221, for example, the internal line button 2 is depressed, the button telephone set 221 determines that the hold button has been depressed before the depression of the internal line button. This button manipulation is same as the fourth button manipulation.

Figure 9:
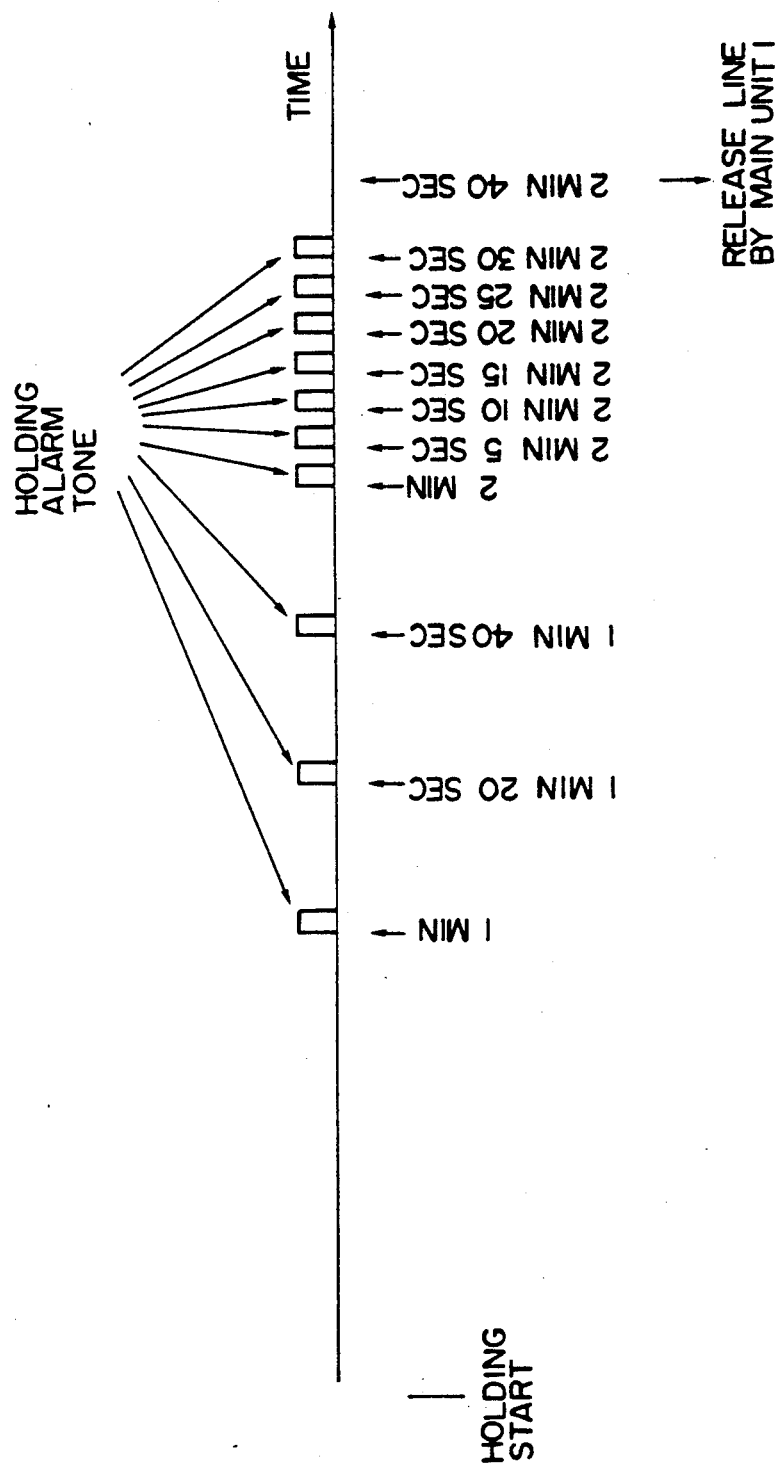
FIG. 9 shows a timing of a hold alarm sound after the hold has been started in the third embodiment.

In the first to sixth button manipulations, if the external line hold is not released a predetermined time (for example, one minute) after the start of the external line hold (self-hold or hold to transfer the external line to other telephone set), the hold alarm tone is generated (for approximately two seconds). If the external line hold is not released thereafter, the hold alarm tone (two-second duration) is generated 1 minute, 1 minute and 20 seconds, 1 minute and 40 seconds, 2 minutes, 2 minutes and 5 seconds, 2 minutes and 10 seconds, 2 minutes and 15 seconds, 2 minutes and 20 seconds, 2 minutes and 25 seconds, and 2 minutes and 30 seconds, after the start of the external line hold. The timing to generate the hold alarm tone is shown in FIG. 9. The hold alarm tone is generated by the holding button telephone set. After 2 minutes and 40 seconds, the external line hold is interrupted and the external line is released.

Thus, when the external line hold is not released the first predetermined time after the start of the external line hold, the hold alarm tone is generated, and the interval between the hold alarm tones is gradually shortened, and if the external line hold is not released the second predetermined time after the start of the external line hold, the line is released.

Figure 10:
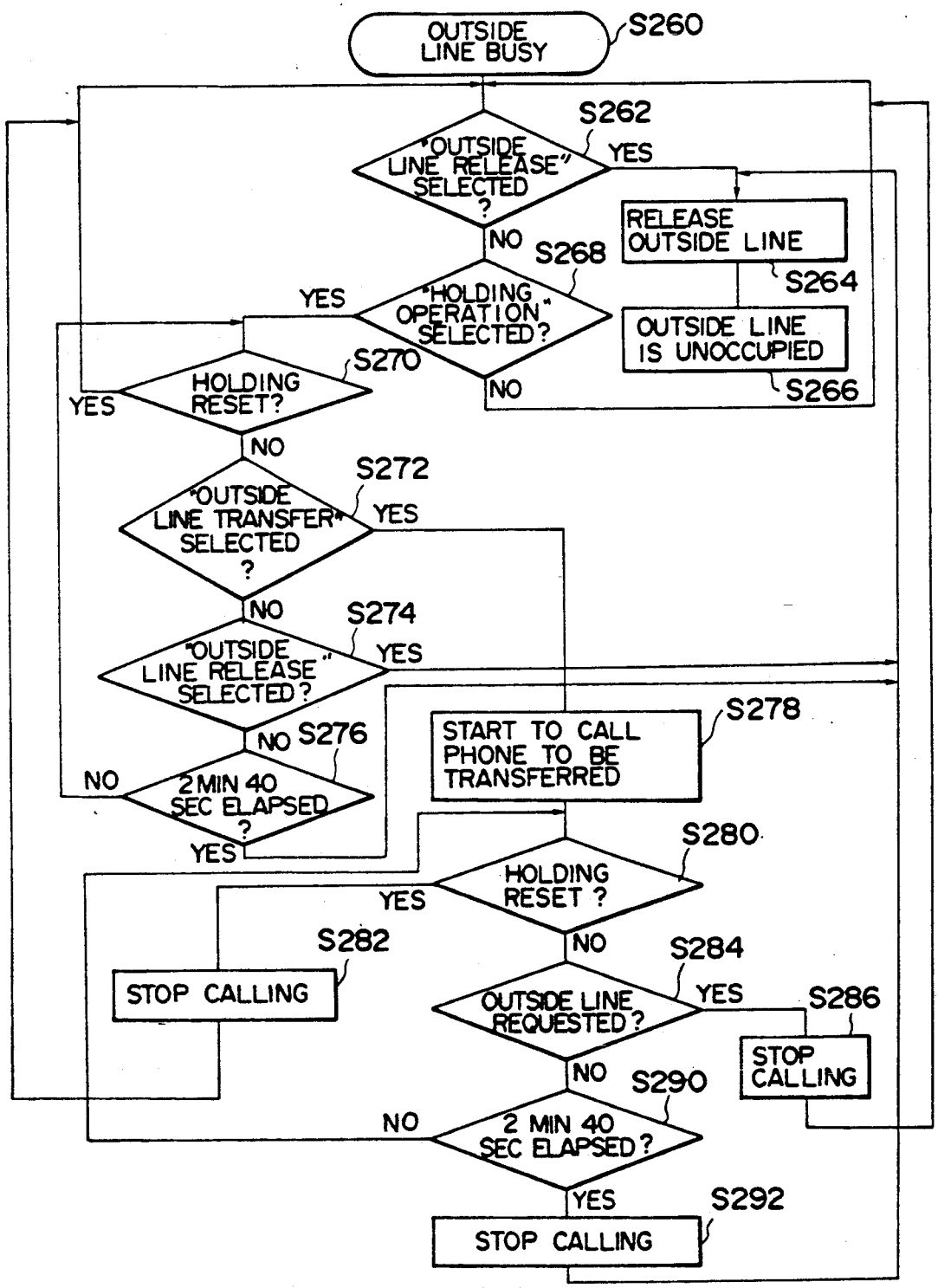
FIG. 10 shows a flow chart of a control operation of a main unit of FIG. 7.

FIG. 10 shows a flow chart of the control operation for the hold function of the control circuit 216 of the main unit 201 of FIG. 7.

If the button telephone set 221, 222 or 223 uses the external line (S260) and that telephone set selects the external line release (S262), the external line is released (S264) and non-use of the external line is indicated (S266).

On the other hand, if the telephone set does not select the external line release but selects the hold (S268), the hold is released (S270), and when the external line transfer is selected (S272), a telephone set other than that which is using the external line is called (S278).

If the hold is released, the process returns to the step S262 and the external line transfer is selected (S272). If the external line release is selected (S274), the external line is released. If the external line release is not selected and the predetermined time has elapsed since the start of hold (S276), the external line is released.

The release of the hold of the button telephone set means the depression of the external line button of the button telephone set, and the selection of the external line transfer of the button telephone set means the depression of the hold button of the button telephone set followed by the depression of the internal line button, or the depression of mere internal line button. The selection of the external line release means the on-hooking of the button telephone set. In the present embodiment, the predetermined time in the step S276 is 2 minutes and 40 seconds.

If the hold is released after the call (S280), the call is stopped (S282). If the hold is not released (S280), the call is stopped (S286) when the operator of the called telephone set requests the external line (S284). The process then returns to the step S262.

In the step S278, if the called telephone set does not request the use of the external line (S284), the above step is repeated until 2 minutes and 40 seconds elapses from the start of the hold (S290), when the call is stopped (S292) and the external line is released.

Figure 11:
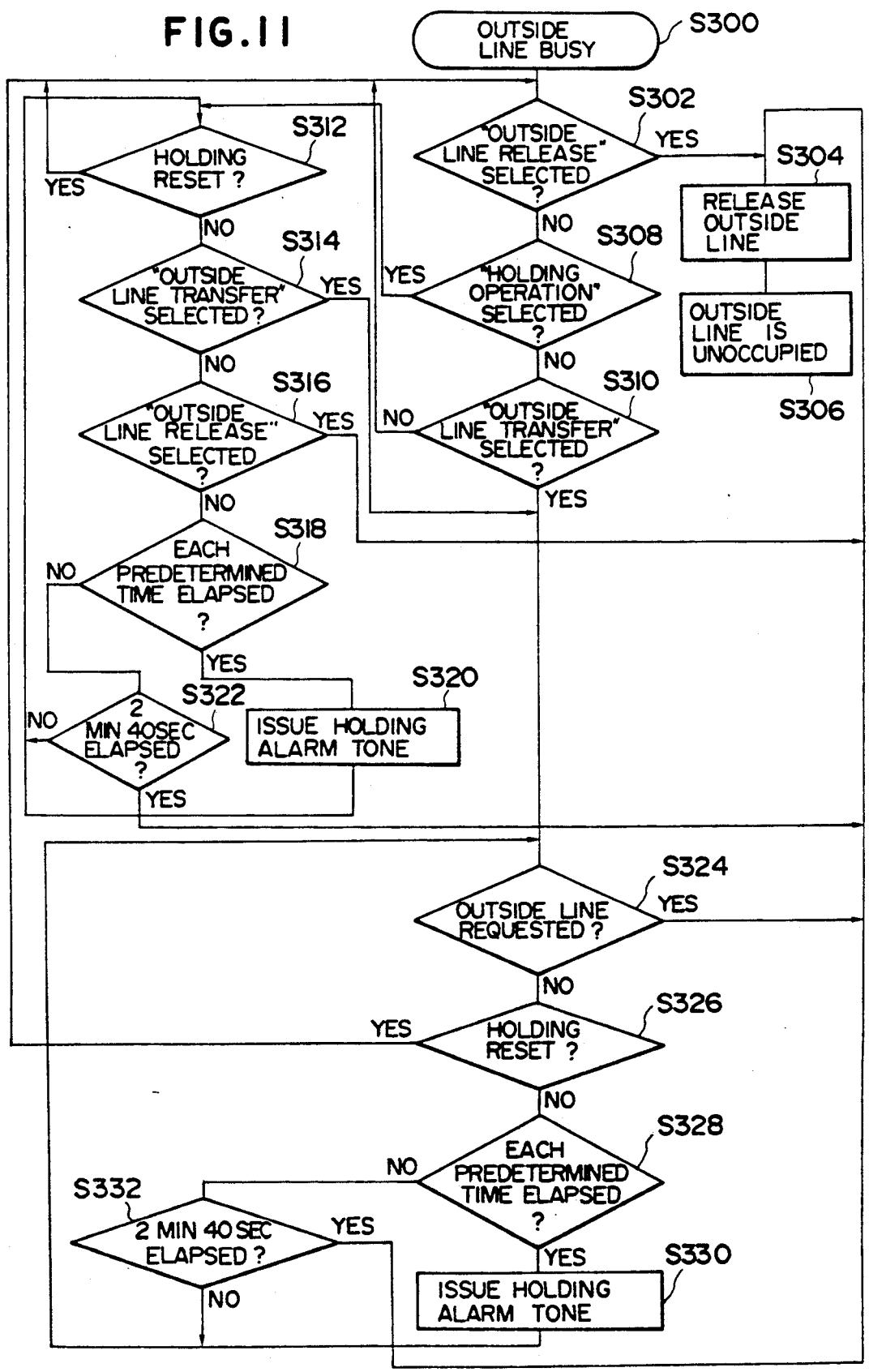
FIG. 11 shows a flow chart of a control operation in connection with a hold function of a control circuit.

FIG. 11 shows a flow chart of the control operation of the hold function of the control circuit 252 of FIG. 8.

When the telephone set 221, 222 or 223 is using the external line (S300), and the external line release is selected (S302), the external line is released and the non-use of the external line is indicated (S304 and S306). When the external line release is not selected (S308) and the hold is not selected and the external line transfer is not selected (S310), the process returns to the step S302.

If the hold is selected in the step S308 and the hold is not released (S312) and the external line transfer is not selected (S314) and the external line release is not selected (S316) and the predetermined time has elapsed since the start of hold (S318), the hold alarm tone is generated (S320) and the process returns to the step S312. If 2 minutes and 40 seconds elapsed from the start of hold (S322), the external line is released.

If the external line transfer is selected in the step S310 and the called telephone set does not request the use of the external line (S323) and the hold is not released (S326) and the predetermined time (1 minute, 1 minute and 20 seconds, 1 minute and 40 seconds, 2 minutes, 2 minutes and 5 seconds, 2 minutes and 10 seconds, 2 minutes and 15 seconds, 2 minutes and 20 seconds, 2 minutes and 25 seconds, and 2 minutes and 30 seconds) has elapsed since the start of the hold (S328), the hold alarm sound is generated (S330) and the process returns to the step S323. On the other hand, if 2 minutes and 40 seconds elapses from the start of hold (S332), the external line is released.

Figure 12:
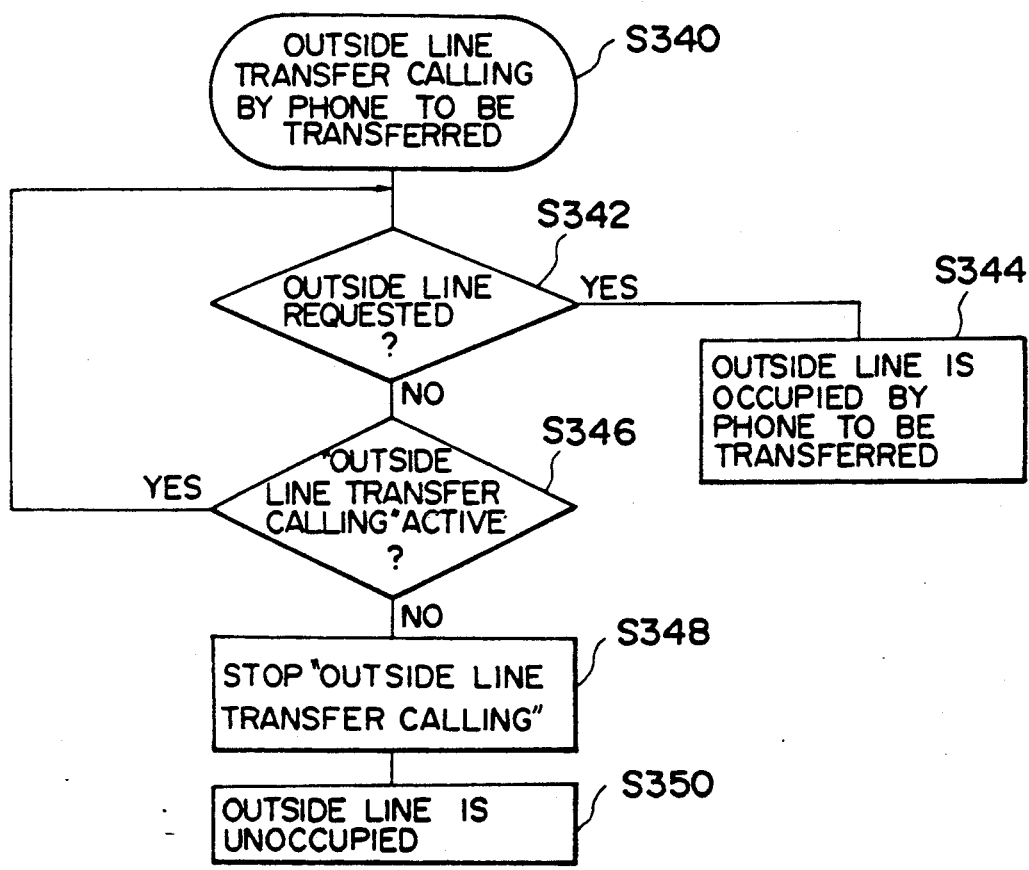
FIG. 12 shows a flow chart of a control operation in connection with a hold function of the control circuit of the push button telephone set of FIG. 2.

FIG. 12 shows a flow chart of the control operation of the hold function of the control circuit 252 of FIG. 8. It shows the control of the transferred button telephone set.

When the transferred button telephone set is calling the external line transfer (S340), if the operator of the transferred button telephone set requests the use of the external line (S342), the busy state of the telephone set with the external line is indicated (S344).

If the operator does not request the use of the external line and the external transfer call is not active (S346), the external line transfer call is stopped (S348) to indicate the non-use of the external line (S350).

In the present embodiment, sound is used as an alarm for the hold although visual means or other means may be used instead.

In the present embodiment, the interval between the hold alarm tones is shortened to inform the operator of the time elapsed from the start of hold. Instead of changing the interval, sound volume may be changed or light intensity may be gradually increased to inform the elapsed time to the operator.

Immediately before the line is released after the long hold time, the release of the line may be preinformed by means other than the hold alarm means. When the external line is to be tranferred to other telephone set, the hold alarm may be generated in accordance with the time elapsed from the depression of the internal line button.

In accordance with the third embodiment, when the external line is held, the elapsed time from the start of hold of the external line can be recognized by hearing the hold alarm tone, and if the operator does not respond while the external line is held, the external line is automatically released after a predetermined time.

In accordance with the present invention, the control of the line connection with the communication destination or release of the line can be efficiently made.

The present invention is not limited to the illustrated embodiments but various modifications thereof may be made.

We claim:

1. A communication system comprising:
    data transmitting means for transmitting image data;
    a plurality of speech communication terminals, each of said plurality of speech communication terminals having input means for inputting data representing a station to which image data is sent from said data transmitting means;
    call means for issuing a call in accordance with the data from said input means;
    receiving means for receiving data representing a station which responds to the call from said call means;
    comparison means for comparing the data received by said receiving means with the data from said input means; and
    control means for controlling display units of said plurality of speech communication terminals in accordance with the comparison result by said comparison means.

2. A communication system according to claim 1, wherein said control means includes said call means.

3. A communication system according to claim 1, wherein said control means includes said receiving means.

4. A communication system according to claim 1, wherein the data received by said receiving means is information contained in a communication protocol signal for the image data communication.

5. A communication system according to claim 1, wherein said control means informs inequality when the comparison result indicates inequality of the compared data.

6. A communication system according to claim 1, wherein said control means releases a communication line when the comparison result indicates inequality.

7. A communication system according to claim 1, wherein said comparison means compares the data before said data transmitting means transmits the image data.

8. A communication system according to claim 1, wherein said control means includes said comparison means.

9. A communication system according to claim 1, wherein said control means controls an operation of said data transmitting means.

10. A communication system according to claim 1, wherein said control means selectively controls said plurality of speech communication terminals.

11. A communication system according to claim 1, wherein said control means is capable of displaying inconsistency information on a speech communication terminal which sends data to said call means.

12. A communication system according to claim 1, wherein the data received by said receiving means is a telephone number of a station which responds to the call form said call means.

13. A system according to claim 1, wherein said control means starts said transmitting means transmitting image data when the comparison result of said comparison means indicates coincidence.

14. A communication system comprising:
    a plurality of communication terminals each having input means for inputting data representing a desired external station; and
    a control apparatus for controlling said plurality of communication terminals, including:
        connecting means for connecting one of said communication terminals to an external line in accordance with a request form said one communication terminal;
        call means for issuing a call over the external line in accordance with the data input from each of said plurality of communication terminals;
        receiving means for receiving data form the external line representing an external station which responds to the call form the call means; and
        control means for controlling display units of said plurality of communication terminals in accordance with the comparison of the data received by said receiving means with the data from said input means.

15. A communication system according to claim 14, wherein said control means informs inequality when the comparison result indicates inequality of the compared data.

16. A communication system according to claim 14, wherein said control means releases a communication line when the comparison result indicates inequality.

17. A communication system according to claim 14, wherein said control means selectively controls said plurality of communication terminals.

18. A communication system according to claim 14, wherein the data received by said receiving means is a telephone number of a station which responds to the call from said call means.

19. A communication system according to claim 14, wherein said control means is capable of displaying inconsistency information on a communication terminal which sends data to said call means.

20. A system according to claim 14, wherein said control means controls said connecting means.

21. A communication system according to claim 14, further comprising data communication means for communicating image data.

22. A communication system according to claim 21, wherein the data received by said receiving means is information contained in a communication protocol signal for the image data communication.

23. A communication system according to claim 21, wherein said control means controls an operation of said data communication means.

24. A communication system according to claim 21, wherein said control means compares the data before said data communication means communicates the image data.

25. A communication system according to claim 21, wherein said input means inputs data representing a terminal to which image data is sent from said data communication means.

26. A system according to claim 21, wherein said control means starts said communication means communicating image data when the comparison result indicates coincidence.

27. A line selection apparatus having a plurality of communication units, adapted to connect one of said plurality of communication units to an external line in accordance with a request from said one communication unit, said apparatus comprising:

call means for issuing a call in accordance with data representing a desired station, input from one of said plurality of communication units;

receiving means for receiving data representing a station which responds to the call issued by said call means; and control means for warning said plurality of communication units when the result of the comparison of the input data with the received data indicates inconsistency.

28. An apparatus according to claim 27, further comprising connecting means for selectively connecting one of said plurality of communication units to the external line.

29. An apparatus according to claim 28, wherein said control means controls said connecting means in such a manner that the external line may be connected to one of said plurality of communication units in accordance with a request from said one communication unit.

30. An apparatus according to claim 28, wherein said connecting means selectively connects a data communication unit or one of a plurality of telephone units to the external line.

31. An apparatus according to claim 30, wherein said control means starts said data communication unit communicating data when the comparison result indicates coincidence.

32. An apparatus according to claim 27, wherein said receiving means receives data contained in a communication protocol signal representing the station which responds to the call issued by said call means.

33. An apparatus according to claim 27, wherein said control means warns a communication unit that the comparison result indicates inconsistency, said communication unit receiving data representing a desired station.

34. An apparatus according to claim 27, wherein said control means receives a telephone number of a station which responds to the call issued by said call means.

35. An apparatus according to claim 27, wherein said control means causes display units of said plurality of communication units to display that the comparison result indicates inconsistency.

36. An apparatus according to claim 27, wherein said control means releases the external line when the comparison result indicates inconsistency.

* * * * *

UNITED STATES PATENT AND TRADEMARK OFFICE
CERTIFICATE OF CORRECTION

PATENT NO. : 5,128,985
DATED : July 7, 1992
INVENTOR(S) : TAKEHIRO YOSHIDA, ET AL.

It is certified that error appears in the above-identified patent and that said Letters Patent is hereby corrected as shown below:

COLUMN 5

Line 6, ""0-""4"" should read --"0" - "4"--.

COLUMN 6

Line 48, "step S452" should read --step S42--.
Line 55, "display 8m, 10m, 12m or 14m of such" should read --display of--.

COLUMN 10

Line 53, "set 21" should read --set 221--.

COLUMN 14

Line 41, "form" should read --from--.
Line 54, "form" should read --from--.

UNITED STATES PATENT AND TRADEMARK OFFICE
CERTIFICATE OF CORRECTION

PATENT NO. : 5,128,985
DATED : July 7, 1992
INVENTOR(S) : TAKEHIRO YOSHIDA, ET AL.

Page 2 of 2

It is certified that error appears in the above-identified patent and that said Letters Patent is hereby corrected as shown below:

<u>COLUMN 14</u>

Line 59, "form" should read --from--.
Line 61, "form" should read --from--.

Signed and Sealed this

Seventh Day of September, 1993

Attest:

BRUCE LEHMAN

*Attesting Officer*   *Commissioner of Patents and Trademarks*